United States Patent [19]

Opsahl

[11] Patent Number: 4,576,347

[45] Date of Patent: Mar. 18, 1986

[54] FLAP TORQUE TUBE SLOT SEAL

[75] Inventor: Allan W. Opsahl, Renton, Wash.

[73] Assignee: The Boeing Company, Seattle, Wash.

[21] Appl. No.: 666,524

[22] Filed: Oct. 30, 1984

[51] Int. Cl.⁴ .............................................. B64C 7/00
[52] U.S. Cl. ................................ 244/130; 244/129.1; 244/216
[58] Field of Search ............ 244/213, 215, 216, 129.1, 244/130, 49, 129.4

[56] References Cited

U.S. PATENT DOCUMENTS

| | | | |
|---|---|---|---|
| 2,410,239 | 10/1946 | Roe | 244/49 |
| 2,526,929 | 10/1950 | Bowcott | 244/216 |
| 3,175,791 | 3/1965 | Toms | 244/130 |
| 3,356,317 | 12/1967 | Bird | 244/129.1 |
| 3,968,946 | 7/1976 | Cole | 244/130 |
| 4,471,925 | 9/1984 | Kunz | 244/215 |

*Primary Examiner*—Trygve M. Blix
*Assistant Examiner*—Rodney Corl

*Attorney, Agent, or Firm*—H. Gus Hartmann; Bernard A. Donahue

[57] ABSTRACT

An inboard wing trailing edge flap of an aircraft has a flap carriage mechanism located within the fuselage or a fuselage/wing fairing structure, and the flap is attached to the carriage by a torque tube which penetrates the side of the fuselage. A slot is required in the fuselage through which the torque tube can travel as the flap is extended and retracted. The slot is covered when the flap is fully retracted, but when the flap is fully extended, airflow through the slot toward the upper surface of the flap causes the flap to lose lift. Therefore, airflow blocker doors are provided for closure of the slot when the flap is fully extended. The doors are held in a closed position by a pressure differential across the slot and by spring-loaded hinges; and the doors are adapted to be opened by engagement of a ramp cam member mounted to the flap torque tube, as the flap is retracted.

3 Claims, 7 Drawing Figures

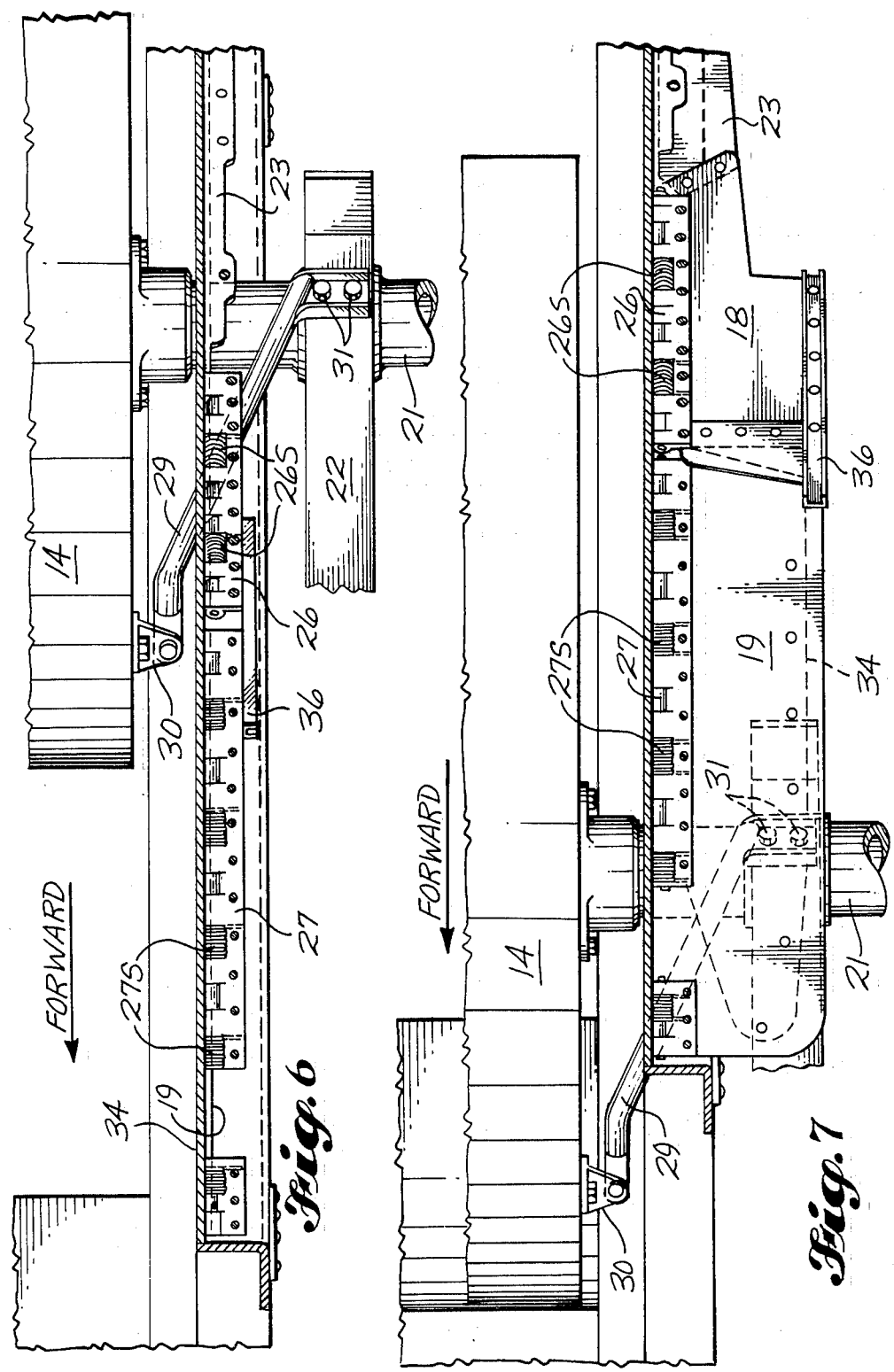

FLAP TORQUE TUBE SLOT SEAL

BACKGROUND OF THE INVENTION

This invention relates to slot seal closures and more particularly to closures for a slot formed in the side of an aircraft fuselage, adjacent an inboard wing trailing edge flap.

In certain types of flap systems, the inboard wing flap has a torque tube which extends into the side of the fuselage or into the side of a fuselage/wing fairing structure; and the inboard end of this flap torque tube is mounted to a flap carriage mechanism for controlled movement of the flap throughout its extension and retraction cycle. This inboard flap carriage mechanism is located within the fusefage or within the fuselage/wing fairing structure; and in the aircraft installation of the present invention, it is located within the main landing gear wheel well.

The inboard flap carriage mechanism is designed to move the inboard flap and its torque tube along a predetermined path which is generally arcuate or curved, and this requires a similar arcuate or curved slot in the side of the fuselage to accommodate translational movement of the flap torque tube during flap extension and retraction. When the flaps are in a fully retracted position, the root end cross-sectional area of the inboard flap and a root end plate adequately cover the curved slot in the side of the fuselage. However, when the flaps are fully extended and the wheels are down for the landing mode, the curved slot is exposed and there is an airflow therethrough that flows spanwise into a low pressure region on the upper surface of the extended inboard flap, that effects separation of the boundary layer airflow over the upper surface of the flap. The problems caused by this initially appeared as numerous incidents of the fuselage tail section striking the runway during the landing flare out just prior to touchdown. Another problem caused by the exposed flap torque tube slot was a vibration that was felt by the pilots just prior to touchdown with full flaps. Numerous flight tests were conducted to solve the problems, and they conclusively indicated that the problems were caused by the lack of a seal for the curved slot in the side of the fuselage when the landing gear and flaps were down for the landing mode. Various attempts were made to seal the curved slot; first with brushes, and when one brush did not provide an adequate seal, then two or three brushes were tried without success.

SUMMARY OF THE INVENTION

The present invention provides an improved closure apparatus for blocking airflow through a curved slot formed in the side wall of an aircraft fuselage adjacent to an inboard wing trailing edge flap. The curved slot provides clearance for displacement movement of a flap torque tube when the flap is moved between a retracted forward position and a fully extended rearward position.

In the disclosed airplane, the inboard carriage for the wing inboard trailing edge flap is located inside a body/wing fairing which is located adjacent to a main landing gear wheel well. The inboard trailing edge flap is attached to the carriage by a torque tube which penetrates the body/wing fairing and thus requires a cutout or slot in the body/wing fairing through which the torque tube can travel as the flap is extended or retracted. The slot is covered by the flap end cross-section area when the flap is in the raised and stowed position; however, when the flap is in the fully extended and lowered position for the landing mode, the slot opening is exposed; and airflow from the main landing gear wheel well passes through the slot opening to the lower pressure region on the upper surface of the extended flap. This spanwise airflow causes a separation of the boundary layer airflow at the inboard or root end of the flap. The effect of this separation of the boundary layer airflow from the upper surface of the flap during the landing mode, or during the flare out just prior to touch down, causes a decrease in the coefficient-of-lift $C_L$ and a loss of lift. The normal reaction of the pilot to this sudden increase in rate-of-descent is to pull back on the yoke, thereby increasing the nose-up attitude of the airplane and causing the tail section of the fuselage to strike the runway.

Also, the effect of the separation of the boundary layer airflow from the upper surface at the inboard end of the flap produces a turbulent wake that trails aft and strikes the horizontal stabilizer, producing a vibration which can be felt by the pilot in the cockpit.

Flight tests, with flow cones attached to the trailing edge of the inboard flap for evaluating the effectiveness of the flap torque-tube slot seal doors of the present invention, were performed; and the flight test data results show a definite decrease in the level of vibration felt by the pilots in the cockpit. This reduced level of vibration provides an improved feel in the control system for the pilots and reduces the vulnerability of the tail of the airplane striking the runway during the landing touchdown. From photographic and visual observation of the flow cones attached to the inboard flap, a reduction in the turbulent wake due to boundary layer airflow separation over the upper surface of the trailing edge flap could be seen. This reduction in boundary layer airflow separation also reduced the wing angle-of-attack required to achieve a particular lift coefficient $C_L$. For a 30° flap setting, in order to achieve the same lift coefficient, the wing angle-of-attack was reduced. This improvement in the pitch attitude of the airplane provides additional clearance between the tail end of the fuselage and the runway during landing touchdown.

An object of the invention is to cover a torque tube slot or cutout in a body/wing fairing structure when a wing trailing edge flap is in a fully extended position for the landing mode.

Another object is to provide a series of doors which are hinged to close or open sequentially by extension or retraction respectively of a wing trailing edge flap.

Another object is to provide a slot seal closure apparatus that aids in maintaining adherence of boundary layer airflow on the upper surface of an inboard trailing edge flap.

BRIEF DESCRIPTION OF THE DRAWINGS

FIG. 6 is a top plan view taken along the hinge line in the direction indicated by 6—6 of FIG. 3, whereat the flap is in a fully extended position, and the doors covering the curved slot opening are closed.

FIG. 7 is a top plan view similarly taken along the hinge line shown in FIG. 6, with the flap in a fully retracted cruise flight position, and the doors are open exposing the curved slot opening.

DESCRIPTION OF THE PREFERRED EMBODIMENT

Figure 1:
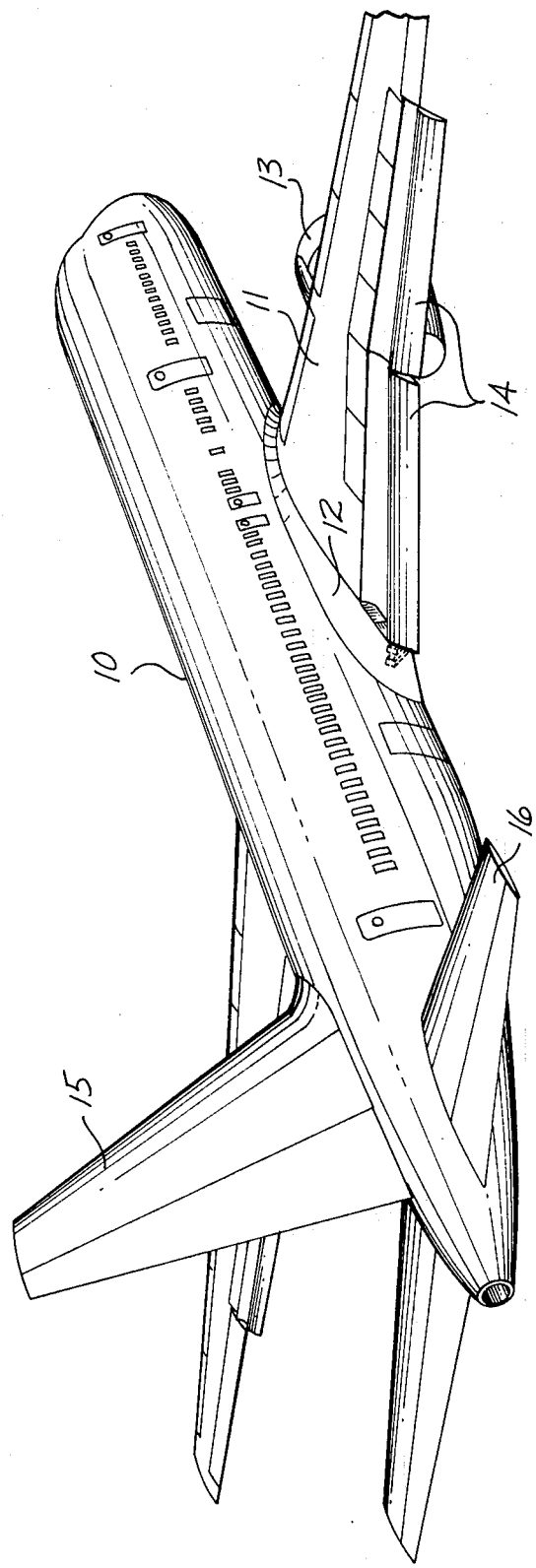
FIG. 1 is a right-side rear perspective view of an airline passenger airplane with wing tailing edge flaps extended.

FIG. 1 is a rear perspective view of a passenger airplane comprising a fuselage 10, a wing 11 mounted to the lower portion of the fuselage 10, with a fuselage/wing fairing 12 therebetween. The wing 11 has a jet engine 13 mounted to its underside and trailing edge flaps 14 depicted in an extended and downward deflected position used generally for the landing mode. The aft section of the fuselage 10 has a vertical and horizontal stabilizer 15 and 16 respectively.

FIGS. 2-7 are detailed illustrations of an aft door 18 and a forward door 19 apparatus made in accordance with the principles of this invention for sealing a curved slot opening 20, when the inboard flaps 14 are fully extended, in order to eliminate a crossflow through the slot opening 20 that can cause boundary layer separation on the upper surface of the flaps 14 and results in decreased lift and vibration. Further, to retract the flaps 14, the door apparatus 18, 19 is constructed so as to expose the curved slot opening 20 in order to allow a flap torque tube 21 which extends through the curved slot opening 20 to translate along the curved slot as the flaps 14 are retracted forwardly.

FIGS. 2-5 are views taken from the interior right side of the aircraft's fuselage 10 or the fuselage/wing fairing structure 12 and looking toward the right side of the fuselage 10 in a direction toward the inboard end of the right inboard wing flap 14 and its torque tube 21 which penetrates the side of the fuselage through a cutout or curved slot 20. The slot 20 is contoured to conform to the arcuate travel of the torque tube 21 during extension and retraction of the wing flap 14. The flap torque tube 21 is fixedly connected to a flap carriage support arm 22 which is directly connected to a flap carriage or track mechanism (not shown).

Figure 2:
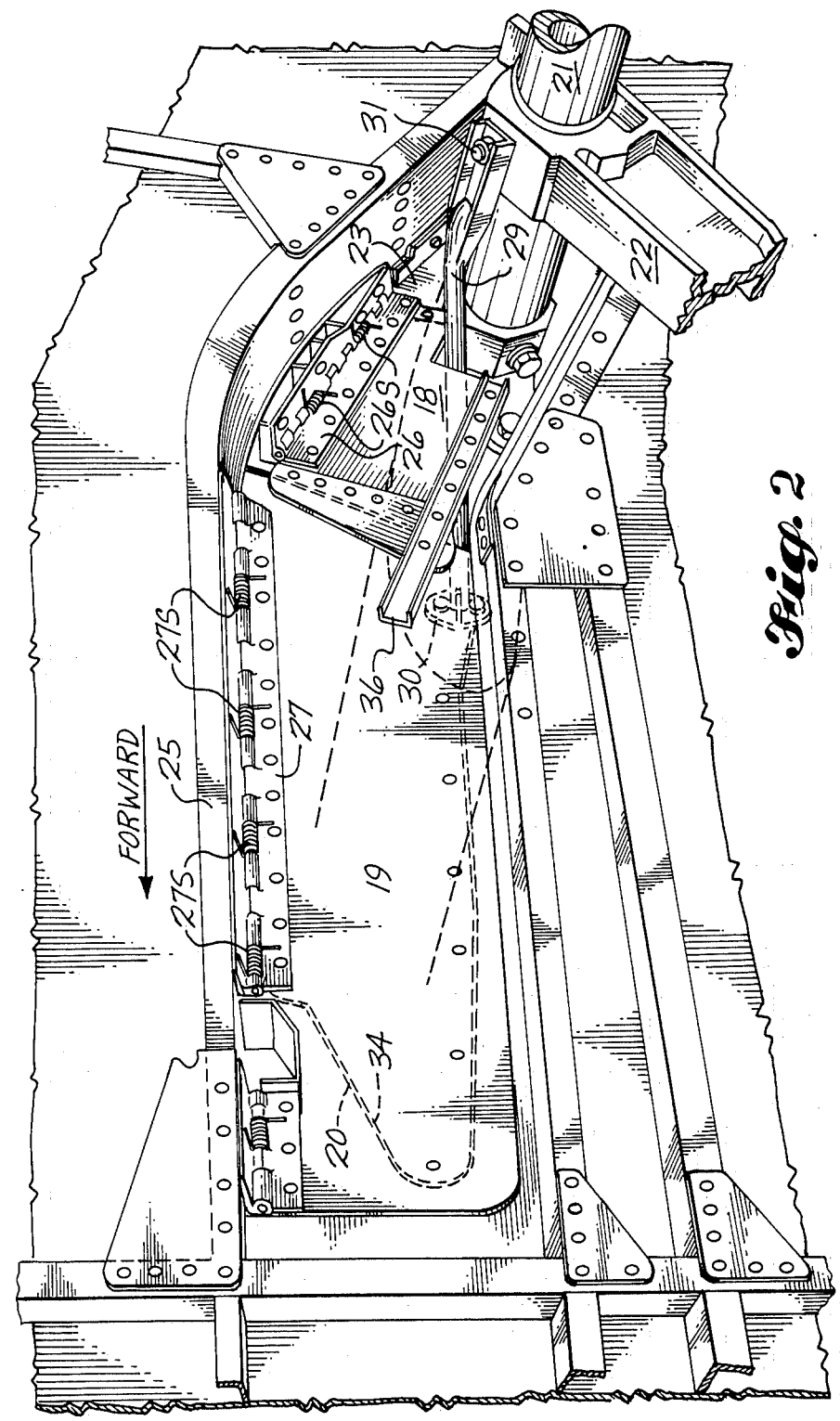
FIG. 2 is a perspective view from inside the fuselage in a direction toward the inboard end of the right inboard wing flap at a fully extended position.
Figure 3:
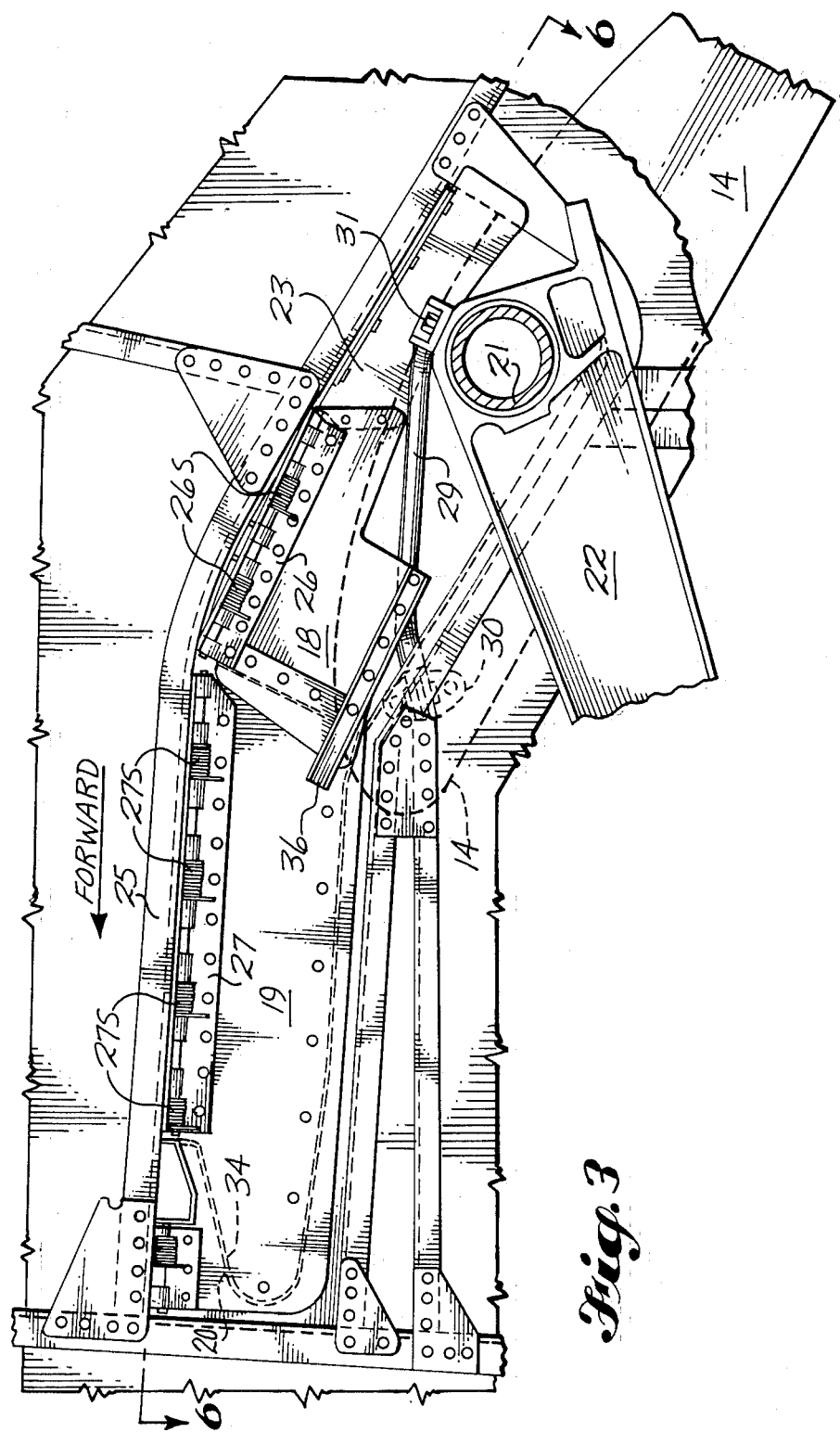
FIG. 3 is a side elevational view of FIG. 2.

FIGS. 2 and 3 show the flap torque tube 21 and the root airfoil cross-section of the flap 14 in dotted outline; and the flap 14 is at a fully extended 30° position for the landing mode. Whereat, an aft first door 18, which has a flexible seal member 23 attached thereto, and a forward second door 19 are all closed against the curved slot 20 to effectively block airflow therethrough. When the flap 14 is in the depicted 30° extension position, both doors 18 and 19 are maintained in their closed position by approximately a one psi pressure differential which exists across the curved slot opening 20.

Referring to FIGS. 2-7, the forward second door 19 is swingably attached to fixed airframe structure or intercostal 25 above the forward half of a curved slot opening 20 by a hinge 27 for swinging the second door about an axis from a horizontal position exposing the curved slot opening 20 to a downward vertical position blocking the forward half of the slot opening 20. One side of the second door hinge 27 is attached to intercostal 25 above the slot opening 20, and the other side of the hinge 27 is attached along the upper edge of the second door. The hinge 27 extends approximately the full length of the second door and includes springs 27S along the hinge axis for biasing the second door toward a position blocking the slot opening 20.

Similarly, a rearward first door 18 is mounted in series with the second door 19 by a first hinge 26, also attached to the intercostal 25 above the rearward half of the curved slot opening 20 for swinging the first door about its hinge axis, which is inclined downwardly rearward from the second hinge axis 27, to block the rearward half of the slot opening.

As the inboard flap torque tube 21 moves forward from its rearwardmost landing position to its forwardmost cruise position, the means which move the first and second doors 18 and 19 from their closed position to their open position comprises an S-shaped tube 29 which functions as a ramp cam.

Referring to FIGS. 6 and 7, the forward end of the S-shaped tube 29 is connected to a lug fitting 30 secured to an end rib of flap 14, and the rearward end of the tube 29 is fastened by bolts 31 to the flap carriage support arm 22 which is fixedly connected to the flap torque tube 21. The intermediate portion of the S-shaped tube 29 angles outwardly and upwardly from fore-to-aft as shown in the side elevational views 3-5 and the plan views 6, 7. The ramp cam tube 29 is contoured to ride against the lower portion of the doors 18 and 19 as they swing from their closed position, shown in FIGS. 2, 3 and 6, to their upward open position shown in FIGS. 5 and 7.

A slot plug panel 34 of composite material or wear resistant material such as phenolic, is peripherally contoured to plug the curved slot opening 20 when the doors 18 and 19 are in the closed position. The slot plug panel 34 is afixed to the outer surface of the doors 18 and 19, i.e., to the side adjacent to curved slot opening 20. The ramp cam tube 29 is contoured to bear against the slot plug panel 34 which serves the additional function of a wear surface, as the doors are opened and closed.

Description of operation of the flap retraction sequence is shown in FIGS. 2 to 5 and 6 to 7. As the flap 14 moves forward toward retraction, the outboard forward portion of the ramp cam tube 29 initially comes into contact with the aft lower edge of the first door 18, forcing it to move outward and swing upward about the first hinge 26 along the upper edge of the first door 18.

Figure 4:
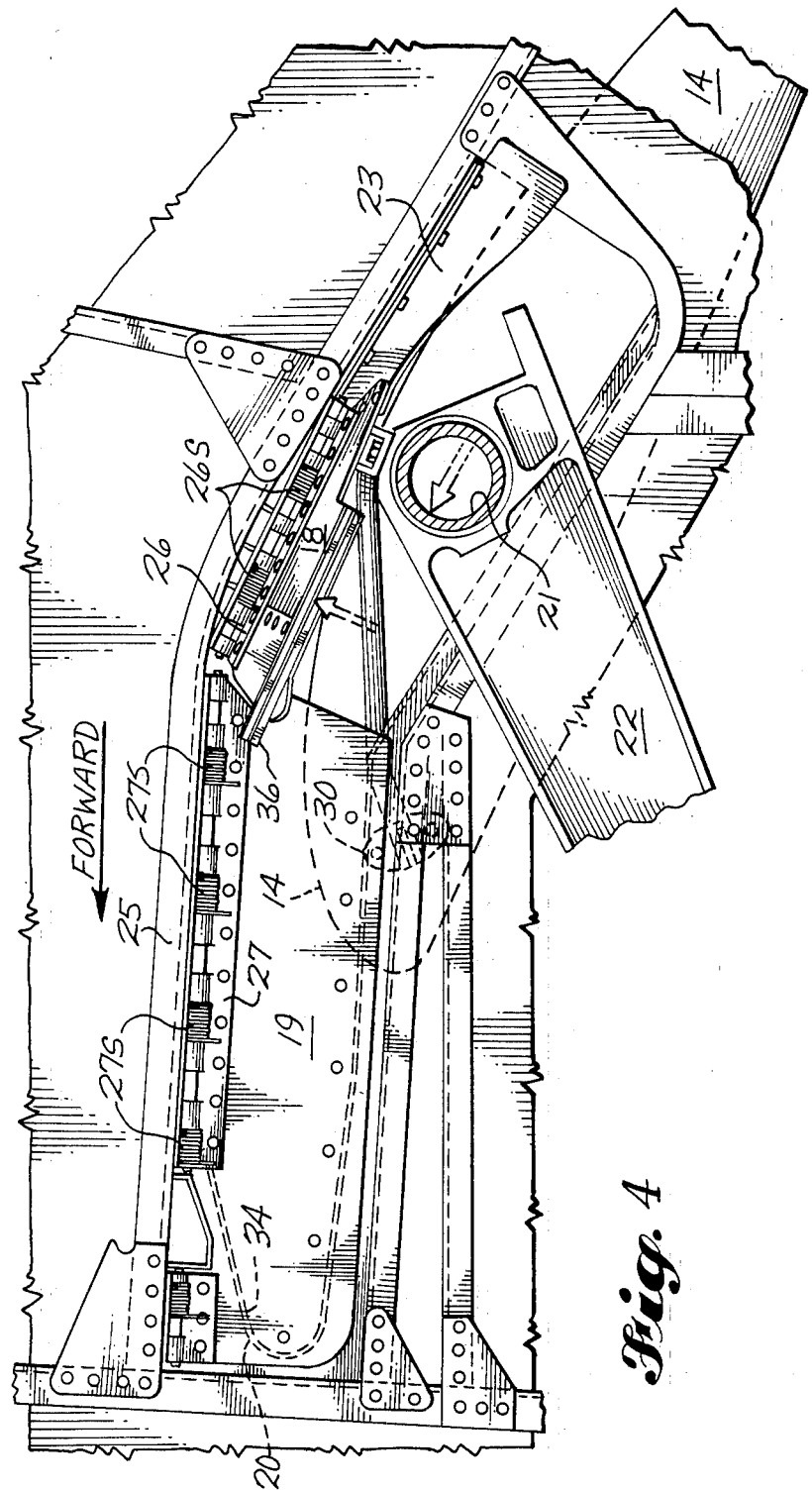
FIG. 4 is a side elevational view, similar to FIG. 3, with the flap raised part way from the fully extended position.
Figure 5:
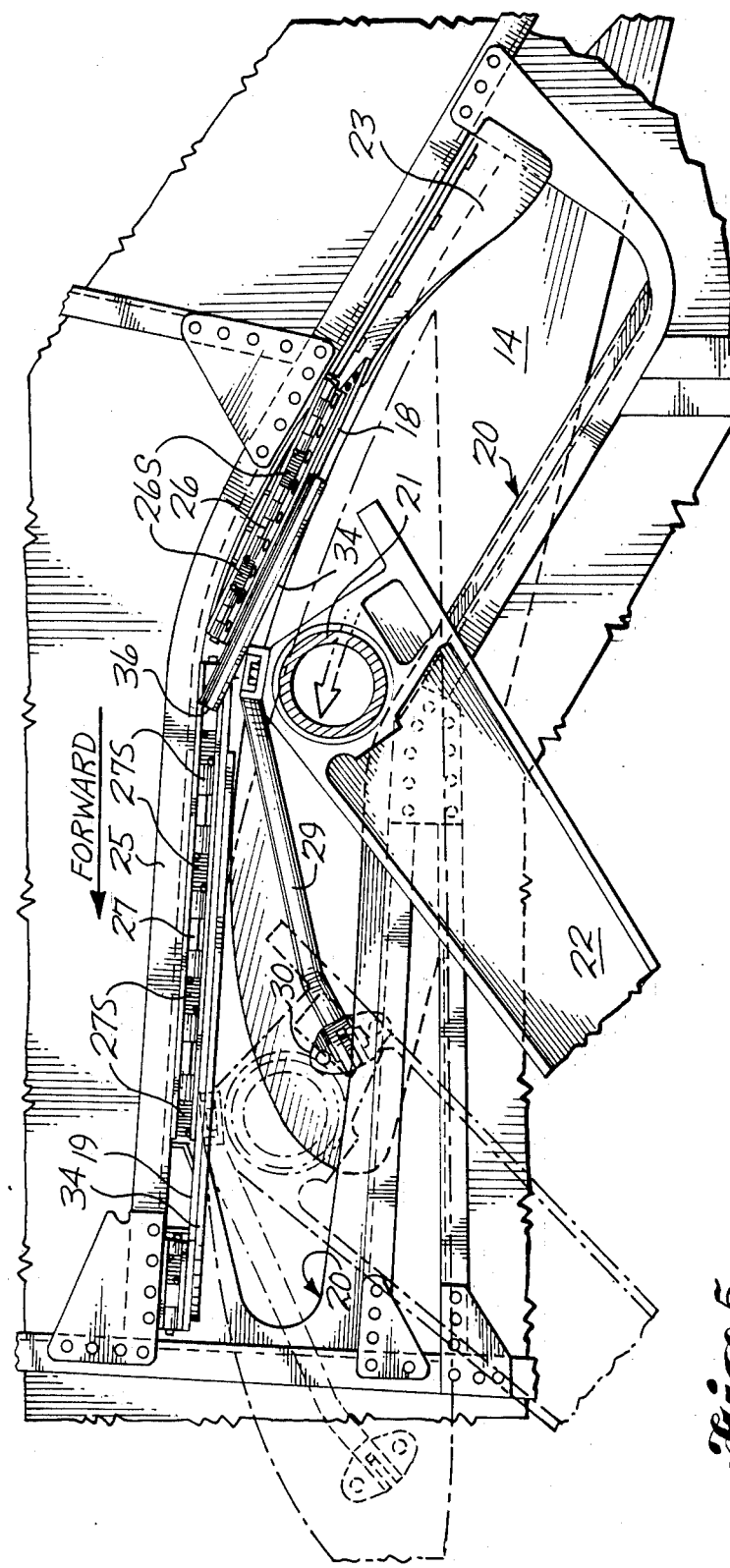
FIG. 5 is a side elevational view, similar to FIGS. 3, 4 with the flap depicted in solid outline at the knee of the curved slot opening and the flap in dotted outline at the fully retracted position.

The S-shape of the ramp cam tube 29, which functions to swing the doors 18 and 19 outwardly, is more clearly shown in FIGS. 6 and 7; and the function of raising the doors 18 and 19 to their upwardmost position for exposing the curved slot opening 20 is more clearly shown in the side elevational views of FIGS. 3 to 5. The ramp can tube 29 provides clearance along the curved slot opening 20 for the flap torque tube 29 to pass As the aft first door 18 is forced by the ramp cam tube 29 to swing open, the approximate one psi pressure differential across the curved slot opening 20 acting to hold it closed, is substantially reduced; and the torsion springs 26S, 27S, which are integral with the hinges 16, 17, maintain the first door 18 in contact with the ramp cam tube 29. The flexible panel-like member 23, which forms a rearward extension of the first door 18, is flexibly bent to also move in conjunction with the first door 18.

As the flap 14 continues to retract, as shown in FIGS. 4 to 5, the ramp cam tube 29 next contacts the aft edge of the forward second door 19 and forces it to rotate about the spring-loaded second hinge axis 27 along the upper edge of the second door 19.

As the flap 14 reaches the fully retracted position, as shown in FIG. 7 and the dash-dot outline in FIG. 5, both doors 18, 19 are held open: the forward second door 19 by contact with the ramp cam tube 29 and the aft first door 18 by virtue of the extension element 36 which overlaps the forward second door 19. In the fully retracted flap position, the root end cross-sectional area of the inboard flap 14 and a root end plate (not shown) adequately cover the curved slot opening 20 in the side of the fuselage 10, and the doors 18 and 19 can remain open without adverse impact.

When the flap 14 is extended, the sequence described above takes place in reverse order.

While the invention has been disclosed with reference to a preferred embodiment, it is to be understood that those modifications and changes which become obvious to a person skilled in the art to which this invention pertains, as a result of the teachings hereof, are considered to be encompassed by the following claims.

I claim:

1. Apparatus for blocking airflow through an opening in the side of an aircraft fuselage adjacent to an inboard wing trailing edge flap, comprising: said flap having a torque tube and being translatable between a forward position and an aft position spaced from said forward position; said fuselage side opening being a curved slot for receiving said flap torque tube therethrough and providing clearance for said flap torque tube during extension and retraction of said flap: doors mounted adjacent to the curved slot opening for blocking passage of air through the slot to the upper surface of said flap when said flap is in a fully extended position; and cam means mounted to said flap torque tube for opening said doors to expose the curved slot opening in response to retraction movement of said flap.

2. The apparatus of claim 1, further comprising: a biasing means associated with said doors for biasing them toward a closed position to cover the curved slot opening.

3. The apparatus of claim 1, further comprising: a panel mounted to a side of said doors and being peripherally contoured for insertion into the curved slot opening to form a surface flush with the side surface of the aircraft fuselage, when said doors are positioned for blocking passage of air through the slot.

* * * * *